United States Patent
Miranda et al.

(10) Patent No.: US 12,273,783 B2
(45) Date of Patent: Apr. 8, 2025

(54) NEIGHBOR LIST AND BEAM MANAGEMENT FOR ATG SYSTEMS

(71) Applicant: GOGO BUSINESS AVIATION LLC, Broomfield, CO (US)

(72) Inventors: Heinz A. Miranda, Cary, IL (US); Michael H. Baker, Elmhurst, IL (US); James P. Michels, Lake Zurich, IL (US); Yong Liu, Chicago, IL (US)

(73) Assignee: GOGO BUSINESS AVIATION LLC, Broomfield, CO (US)

( * ) Notice: Subject to any disclaimer, the term of this patent is extended or adjusted under 35 U.S.C. 154(b) by 373 days.

(21) Appl. No.: 17/741,918

(22) Filed: May 11, 2022

(65) Prior Publication Data
US 2023/0370935 A1 Nov. 16, 2023

(51) Int. Cl.
*H04W 36/32* (2009.01)
*H04W 36/00* (2009.01)
*H04W 36/30* (2009.01)
*H04W 84/06* (2009.01)

(52) U.S. Cl.
CPC ..... *H04W 36/32* (2013.01); *H04W 36/00835* (2018.08); *H04W 36/305* (2018.08); *H04W 84/06* (2013.01)

(58) Field of Classification Search
CPC ........... H04W 36/32; H04W 36/00835; H04W 36/305; H04W 84/06; H04B 7/18506
USPC ................................................ 370/331–332
See application file for complete search history.

(56) References Cited

U.S. PATENT DOCUMENTS

| | | | |
|---|---|---|---|
| 8,611,896 B2 | 12/2013 | Nader et al. | |
| 10,044,433 B2 | 8/2018 | Miranda et al. | |
| 11,166,205 B2 | 11/2021 | Pazhyannur et al. | |
| 2019/0245614 A1 | 8/2019 | Lucky et al. | |
| 2020/0187031 A1 | 6/2020 | Kazmi et al. | |
| 2020/0236602 A1* | 7/2020 | Mahkonen | H04W 36/08 |
| 2021/0185568 A1* | 6/2021 | Chang | B64C 39/024 |
| 2021/0352559 A1* | 11/2021 | Casamayón Antón | H04W 36/322 |

(Continued)

FOREIGN PATENT DOCUMENTS

WO WO-2019/132746 A1 7/2019

OTHER PUBLICATIONS

International Application No. PCT/US2023/019885, International Search Report and Written Opinion, mailed Aug. 22, 2023.

*Primary Examiner* — Candal Elpenord
(74) *Attorney, Agent, or Firm* — MARSHALL, GERSTEIN & BORUN LLP; Randall G. Rueth

(57) ABSTRACT

Systems and methods may facilitate initial establishment and/or handover of an air-to-ground (ATG) communication link between an aircraft and a ground-based cellular communication network (e.g., a 5G network). The systems and methods may be particularly applicable for an aircraft having a user equipment (UE) antenna that uses narrow beamforming to connect to a cell of a base station (gNB). The UE identifies candidate cells based upon the location of the UE and locations and orientations of cells in the network, identifies a cell having a higher likelihood of connection success compare to other cells, and directs a beam to the chosen cell. The systems and methods may enable the UE to create neighbor lists in real time based upon the UE location, and may prevent blind searching normally associated with narrow beamforming methods.

16 Claims, 6 Drawing Sheets

(56) References Cited

U.S. PATENT DOCUMENTS

| | | |
|---|---|---|
| 2022/0015102 A1 | 1/2022 | Gallagher et al. |
| 2022/0060949 A1 | 2/2022 | Clairgironnet et al. |
| 2022/0069449 A1* | 3/2022 | Xue .................. H01Q 1/28 |

* cited by examiner

NEIGHBOR LIST AND BEAM MANAGEMENT FOR ATG SYSTEMS

FIELD

The present disclosure generally relates to a cellular communication system, and in particular, to systems and methods for establishment and/or transfer of a connection of an aircraft to a base station in a cellular communication network.

BACKGROUND

While an aircraft is in-flight, onboard electronic devices such as avionics devices, passenger-owned smartphones, laptop computers, seatback-mounted units, etc. may access the Internet and/or other ground-based communication networks via a communicative link between the aircraft and the ground. Often, the communicative link is an air-to-ground (ATG) communication link to a ground-based network (e.g., 5G network) implemented via a plurality of base stations distributed geographically about an area covered by the ground-based network.

To gain ATG connectivity, user equipment (UE) of the aircraft may transmit a directed signal (or "beam") toward a base station capable of serving the aircraft in unidirectional and/or bidirectional communications. The steps involved in connecting to an appropriate base station may introduce significant delays in the establishment of an initial connection of the aircraft to the network, and/or in the handover of the network connection from a first base station to a second base station as the aircraft moves through a geographic area covered by the network.

SUMMARY

The disclosure of the present application describes computing systems and methods that may facilitate initial establishment and/or handover of an ATG communication link between an aircraft and a ground-based cellular communication network (e.g., a 5G network such as a 5G New Radio (NR) network). Systems and methods herein may be particularly applicable for an aircraft with a user equipment (UE) antenna that uses narrow beamforming to connect to a cell of a base station (gNB, e.g., 5G base station). At a high level, the UE identifies candidate cells based upon location of the UE and respective locations and orientations of cells in the network, identifies a cell having a highest likelihood of successfully establishing the ATG communication link with the aircraft antenna, and forms a beam directed to the gNB of the chosen cell. The systems and methods may enable the UE to create neighbor lists in real time based upon the UE location, and may prevent blind searching normally associated with narrow beamforming methods.

In an embodiment, a computer-implemented method is provided, the method being performed via one or more processors of a user equipment unit (UE) aboard an aircraft in-flight. The computer-implemented method may include (1) obtaining a location of the UE, (2) obtaining, from a sitemap stored at a memory of the UE, respective locations, cell orientations and cell identifiers of a plurality of network cells in a ground-based communication network, each of the network cells respectively being implemented by a corresponding one of a plurality of terrestrial base stations each having a corresponding base station antenna, (3) generating a filtered list of candidate cells for establishing an air-to-ground (ATG) communication link with an antenna of the aircraft, the list of candidate cells being selected from among the plurality of network cells based at least upon the UE location and the respective locations and cell orientations of the plurality of network cells, (4) determining a value of a link loss metric for each respective candidate cell in the list of candidate cells, a link loss metric value indicative of a likelihood of the aircraft antenna at the UE location successfully forming an ATG communication link to the respective candidate cell, (5) selecting a first candidate cell from among the list of candidate cells, based upon determining that the first candidate cell has at least one of (a) a highest likelihood from among the list of candidate cells of successfully establishing the ATG communication link with the aircraft antenna, or (b) at least a predetermined threshold likelihood of successfully establishing the ATG communication link, and/or (6) causing the aircraft antenna to attempt to establish the ATG communication link with the first candidate cell. The method may include additional, fewer, or alternate actions, including those described herein.

In another embodiment, a computer system aboard an aircraft is provided. The computer system may include one or more processors, and one or more memories storing (1) a sitemap storing respective locations, cell orientations and cell identifiers of a plurality of network cells in a ground-based communication network, each of the network cells respectively being implemented by a corresponding one of a plurality of terrestrial base stations each having a corresponding base station antenna, and (2) non-transitory computer executable instructions. The instructions, when executed via the one or more processors, may cause the system to (1) obtain a location of a user equipment unit (UE) of the aircraft, (2) generate a filtered list of candidate cells for establishing an air-to-ground (ATG) communication link with an antenna of the aircraft, the list of candidate cells being selected from among the plurality of network cells based at least upon the UE location and the respective locations and cell orientations of the plurality of network cells, (3) determine a value of a link loss metric for each respective candidate cell in the list of candidate cells, a link loss metric value indicative of a likelihood of the aircraft antenna at the UE location successfully forming an ATG communication link to the respective candidate cell, (4) select a first candidate cell from among the list of candidate cells, based upon determining that the first candidate cell has at least one of (a) a highest likelihood from among the list of candidate cells of successfully establishing the ATG communication link with the aircraft antenna, or (b) at least a predetermined threshold likelihood of successfully establishing the ATG communication link, and/or (5) cause the aircraft antenna to attempt to establish the ATG communication link with the first candidate cell. The computer system may include additional, fewer, or alternate computing elements and/or instructions, including those described herein.

In still another embodiment, one or more non-transitory computer-readable media are provided. The one or more non-transitory computer readable media store non-transitory computer executable instructions that, when executed via the one or more processors, cause the one or more processors to (1) obtain a location of a user equipment unit (UE) aboard an aircraft in-flight, (2) obtain, from a sitemap stored at a memory of the UE, respective locations, cell orientations and cell identifiers of a plurality of network cells in a ground-based communication network, each of the network cells respectively being implemented by a corresponding one of a plurality of terrestrial base stations each having a corresponding base station antenna, (3) generate a filtered list of candidate cells for establishing an air-to-ground (ATG) communication link with an antenna of the aircraft, the list of candidate cells being selected from among the plurality of network cells based at least upon the UE location and the respective locations and cell orientations of the plurality of network cells, (4) determine, via the one or more processors, a value of a link loss metric for each respective candidate cell in the list of candidate cells, a link loss metric value indicative of a likelihood of the aircraft antenna at the UE location successfully forming an ATG communication link to the respective candidate cell, (5) select a first candidate cell from among the list of candidate cells, based upon determining that the first candidate cell has at least one of (a) a highest likelihood from among the list of candidate cells of successfully establishing the ATG communication link with the aircraft antenna, or (b) at least a predetermined threshold likelihood of successfully establishing the ATG communication link, and/or (6) cause the aircraft antenna to attempt to establish the ATG communication link with the first candidate cell. The one or more non-transitory computer-readable media may include additional, fewer, or alternate instructions, including those described herein.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DETAILED DESCRIPTION

At a high level, the disclosure of the present application describes systems and methods that may facilitate initial establishment and/or handover of an air-to-ground (ATG) communication link between an aircraft and a ground-based cellular communication network (e.g., a 5G network such as a 5G New Radio (NR) network). Systems and methods herein may be particularly applicable for an aircraft with a user equipment (UE) antenna that uses narrow beamforming to connect to a cell of a base station (gNB, e.g., a 5G base station) in consideration of interference in the frequency spectrum in which the ATG communication link operates (e.g., the 2.4 GHz unlicensed spectrum).

At a high level, equipment of the aircraft identifies candidate cells based at least upon a location of the UE and locations and orientations of cells in the network. This information is stored as a "sitemap" at the UE. Based upon the sitemap and for the given latitude, longitude, and altitude of the aircraft, the UE chooses a cell having a highest likelihood of connection success compare to other cells, and forms a beam directed at the gNB of the identified cell as a first attempt at establishing the ATG communication link. The systems and methods described herein may enable the UE to create neighbor lists in real time based upon its location, and as will be understood from subsequent sections of this disclosure, may prevent blind searching normally associated with narrow beamforming methods in initial establishment of the ATG communication link. Moreover, by using these systems and methods during a handover of the ATG communication link, the UE may provide improvements over conventional techniques by which the aircraft relies upon a radio access network (RAN) on the ground to provide neighbor candidates to the aircraft.

In accordance with some aspects of the systems and methods described herein, the cellular communication network(s) described herein may be a fifth-generation (5G) ATG cellular communication network. In some embodiments, though, the cellular communication network may be a 4G network, a network using future technology standards, and/or another type of communication network.

Example Air-to-Ground Communication System

Figure 1:
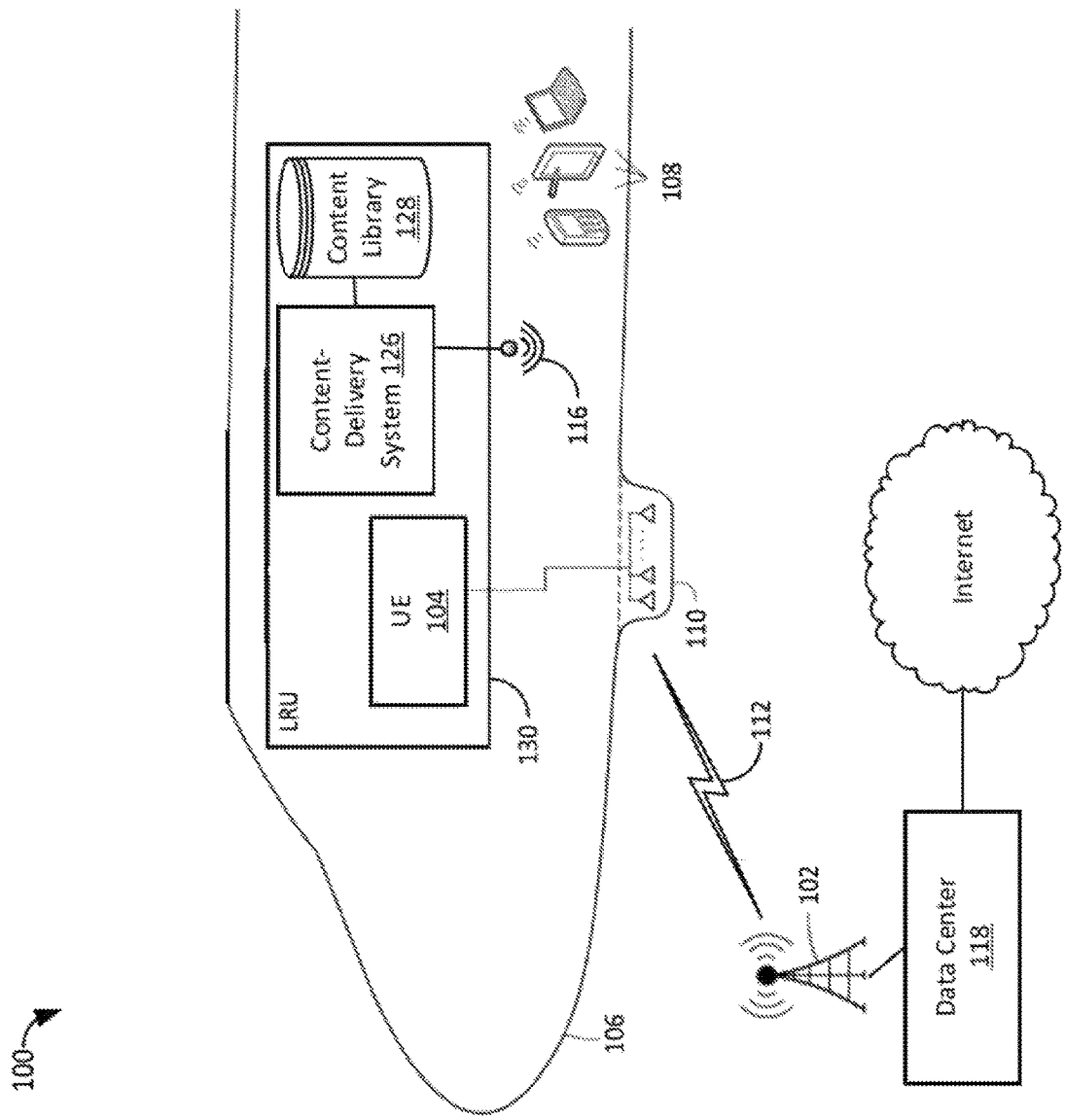
FIG. 1 depicts an example computing environment in which the techniques described herein may be implemented, in accordance with some embodiments.

FIG. 1 depicts an example cellular communication system 100 (e.g., a 5G NR communication system) via which the techniques described herein may be implemented.

The communication system 100, as illustrated in FIG. 1, includes a ground base station 102 (gNB, e.g., a 5G gNB). It should be understood that, while just one gNB 102 is illustrated in FIG. 1, the communication system 100 may include a plurality of gNBs 102 distributed over a geographic area covered by the communication system 100.

The communication system 100 includes a user equipment unit (UE) 104 (i.e., a set of one or more user equipment devices) operating aboard an aircraft 106. The aircraft 106 may carry electronic devices 108 such as passenger smartphones, laptops, e-readers, smart wearable devices, seat-back-mounted devices, avionics devices, etc. The aircraft 106 may communicate with the gNB 102 via an antenna 110 (i.e., one or more antenna elements) using an air-to-ground (ATG) cellular communication link 112 (e.g., 5G ATG link). Although the UE 104 and antenna 110 are depicted as separate elements in the system 100, it should be appreciated that some references to "the UE" or "the aircraft UE" in this detailed description may refer specifically to the aircraft antenna associated with the UE ("UE antenna").

A local communication network 116 (e.g., Wi-Fi network) is implemented aboard the aircraft 106 to provide communication services (e.g., Internet access, cellular calling capability, etc.) to the electronic devices 108 while the electronic devices 108 are aboard the aircraft 106 in-flight. The communication services aboard the aircraft 106 are provided by way of the cellular communication link 112 between the UE 104 and the gNB 102, which may be connected to a data center 118 and/or to the Internet. Generally speaking, the local communication network 116 is a network or group of networks disposed, managed, and/or hosted on-board the aircraft 106. The network 116 can include various nodes and links used for data and/or communication exchange between the nodes. In an embodiment, nodes of the network 116 can also communicate with nodes outside of the network 116 (via, e.g., the links 112, 120). The network 116 can include one or more of a wired network, a wireless network, or a network that uses a combination of wired and wireless technology. Further, the network 116 can include a public or a private network. In an embodiment, the network 116 includes one or more access points that allow some or all of the electronic devices 108 to connect to the network 116. For example, the network 116 can include networking equipment such as routers, hubs, switches, repeaters, bridges, and/or gateway devices. Some of the networking equipment may utilize a spread spectrum paradigm and/or one or more RF bands (e.g., an ISM band, such as the 900 MHz band, 2.4 GHz band or 5 GHz band) to facilitate communication.

The aircraft 106 can include a content-delivery system 126 configured to, among other things, deliver content from an onboard content library 128 or a remote content library to the electronic devices 108 via the communication network 116. The content-delivery system 126 can deliver content to the electronic devices 108 regardless of its connection to an external network, such as the Internet. The UE 104, the content-delivery system 126, and the content library 128 can be implemented within a line replaceable unit (LRU) 130, in some examples. Typically, an LRU is an electronic assembly that performs a specific function in the aircraft 106, can be removed or replaced as a unit, and can be serviced at a vehicle maintenance center.

While not specifically shown in FIG. 1 for clarity of illustration, the aircraft 106 can include electronic systems such as avionics systems (or equivalents for non-aircraft vehicles), such as communication systems, navigation systems, instrumentation, flight-control systems, or collision avoidance systems. The electronics system can also include non-avionics systems (e.g., electronics not specifically designed for use in an aircraft) such as control systems, data distribution devices, etc. As many of the electronics systems may require a level of stability and/or secure attachment during transportation, at least some of the electronics systems can be included in an LRU that is fixedly or rigidly attached to the aircraft 106. Some of the electronics systems may not be included in LRUs. For example, instead of being fixedly connected to the aircraft 106 via LRUs, some electronics systems can be fixedly connected to the aircraft 106 using some other means, such as a bracket or other connecting device.

The communication system 100 may include additional, fewer, and/or alternate components, in various embodiments.

Example Air-to-Ground Network Geometry

As noted above in the discussion of FIG. 1, a cellular communication network (e.g., 5G NR network) typically includes a plurality of ground base stations (gNBs) distributed over a geographic area in which the communication network is implemented. An aircraft accesses the communication network by establishing and maintaining an ATG communication link with one (or sometimes, more than one) of the gNBs. The aircraft communicates with a particular one of the gNBs via the aircraft antenna transmitting a directed signal (or "beam") toward the gNB, and by similarly by the aircraft antenna receiving a signal from the gNB. In some implementations, the beam transmitted by the aircraft antenna is a wide beam, covering a large angular distance in the azimuth and/or elevation angles relative to the aircraft. In other implementations (for example, where the antenna includes a phased array), the aircraft antenna transmits a narrower beam. As will be discussed herein, the use of narrower, more focused beams is often motivated by the external interference in the frequency spectrum in which the ATG communication link operates (e.g., interference that exists in the 2.4 GHz unlicensed frequency band due to activity separate from the particular ATG communication link implemented in the systems and methods described herein).

Generally, aircraft choosing a gNB (or a particular one of a plurality of directional cells implemented therein) requires the aircraft to choose a gNB or cell that is within line-of-sight of the aircraft and that can communicate with the aircraft with a sufficient signal quality to implement the ATG communicative link. However, due to geometric limitations that will be discussed with respect to FIGS. 2 and 3, not all gNBs and cells in the communication network are typically available to the aircraft at any given time.

Figure 2:
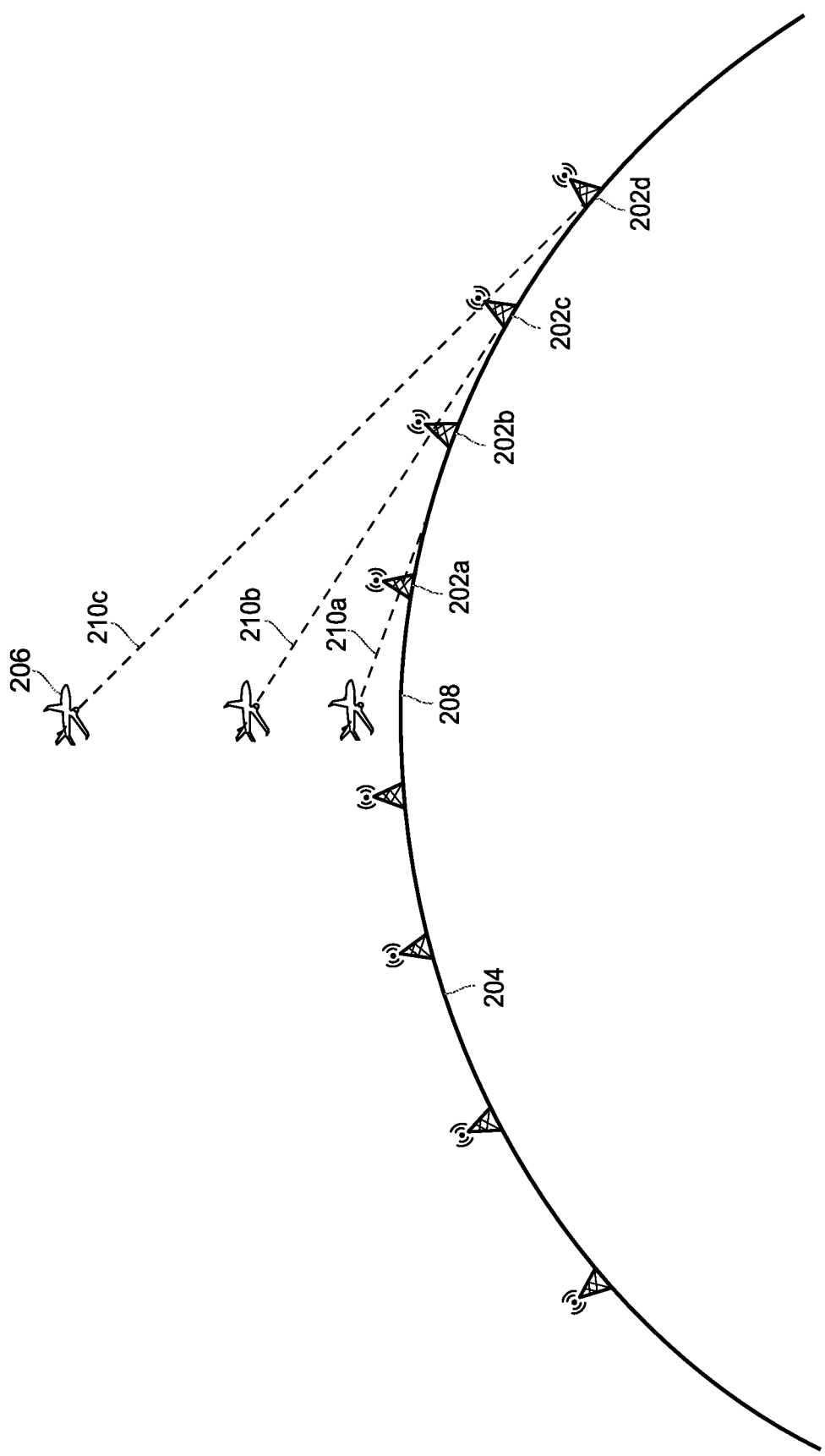
FIG. 2 depicts a view of an aircraft with respect to a plurality of ground base stations (gNBs), in accordance with some embodiments.

By way of example, FIG. 2 illustrates a plurality of gNBs 202a-202d on the ground 204 in a geographic area in which a terrestrial communication network is implemented. Above the ground 204, an aircraft 206 is illustrated at first, second, and third altitudes above a fixed point 208 on the ground 204, with the third altitude being the farthest above the ground point 208. Dashed lines represent beams 210a, 210b, and 210c transmitted by the aircraft 206 at the first, second, and third altitudes, respectively. More specifically, the beams 210a-210c are transmitted toward the farthest ground distance on the point 208 that can be reached by the respective beams 210a-210c. This farthest distance reachable from the aircraft is referred to as the radio horizon, which increases as a function of altitude of the aircraft 206 above the ground point 208.

The ability of the aircraft 206 to connect to gNBs 202a-202d at a given altitude is thus limited at least by the radio horizon at the given altitude of the aircraft 206. For example, at the first altitude, the aircraft 206 is capable of connecting to the gNB 202a, but not the gNBs 202b, 202c, 202d (the aircraft 206 may also connect to other ones of the gNBs (not numbered) within the radio horizon illustrated by the beam 210a). At the second altitude, the aircraft 210b may connect to the gNBs 202a, 202b, 202c, but not the gNB 202d. At the third altitude, the aircraft 206 may connect to any of the gNBs 202a-202d). Of course, the radio horizon for the aircraft 206 at any of the first, second, and third altitudes may vary based upon geographic features on the ground (e.g., mountains, valleys, man-made structures, etc.) and/or atmospheric conditions along the path of the beams 210a-210c (e.g., atmospheric diffraction). Furthermore, the radio horizon for the aircraft 206 at a given altitude is not necessarily the same in every direction in the azimuth around the aircraft 206 (e.g., geographic features and/or atmospheric conditions in different azimuth directions around the aircraft 206).

Thus, according to embodiments of the systems and methods described herein, for the aircraft 206 to establish a connection to one of the gNBs 202a-202d (or, transfer the connection between two of the gNBs 202a-202d), the aircraft 206 identifies which "candidate gNBs," and more specifically, which "candidate cells" in each gNB are within the radio horizon of the aircraft 206 at its current altitude. However, as will be understood from FIG. 3, connection candidates for the aircraft 206 may be limited not only by location of the candidate cells within the radio horizon, but also by the angular orientation of each of the cells relative to its corresponding gNB.

Figure 3:
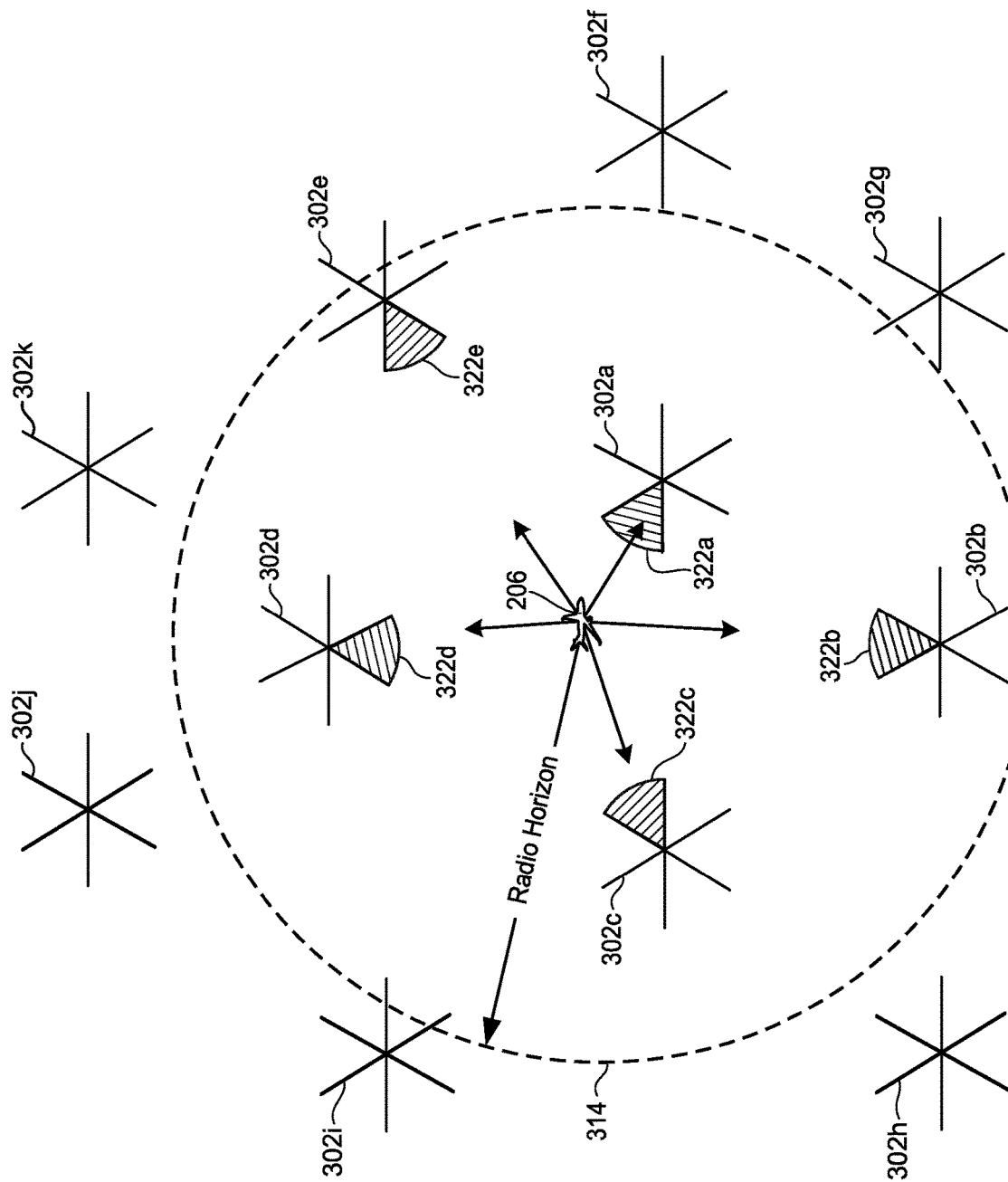
FIG. 3 depicts another view of the aircraft with respect to a plurality of gNBs and cells therein, in accordance with some embodiments.

FIG. 3 depicts an aerial view of the aircraft 206 in an example communication network including gNBs 302a-302k. Based upon the principles established with respect to FIG. 2, the radio horizon 314 is represented as a perimeter at a distance in each azimuth direction around the aircraft 206. Although the radio horizon 314 is depicted as being circular for the sake of simplicity (i.e., having a same radius in every azimuth direction), the radio horizon 314 in practice may be affected by earth geography, atmospheric conditions, etc., and thus may not have a uniform radius in every azimuth direction. The gNBs having at least one cell to which the aircraft 206 may connect include those gNBs that are inside of the radio horizon 314, namely gNBs 302a, 302b, 302c, 302d, and 302e. On the other hand, the aircraft 206 at its current position and altitude may be incapable of connecting to cells of any of the gNBs 302f-302k.

Each of the gNBs 302a-302k implements a plurality of cells, with each cell having an angular coverage area in the azimuth direction relative to the respective gNB. For example, as illustrated in FIG. 3, the area covered by each of the gNBs 302a-302k may include six cells, each covering an angular area of approximately sixty degrees in the azimuth around the respective gNB 302a-302k. The aircraft 206, when connecting to a particular one of the gNBs 302a-302k, more specifically connects to a particular one of the cells of the particular gNB, namely the cell with an angular coverage area facing toward the aircraft 206 from the particular gNB. For example, as illustrated by way of shaded cells in FIG. 3, the aircraft 206 may connect to a cell 322a of the gNB 302a, a cell 322b of gNB 302b, cell 322c of gNB 322c, etc. As the aircraft 206 moves through the geographic area in which the communication network is implemented, the aircraft may pass between coverage by two or more different ones of the gNBs 302a-302k, and/or between coverage by two or more different cells of a same one of the gNBs 302a-302k.

Challenges in initial establishment and/or handover of the ATG communication link emerge in view of the systems described above. For one, for the aircraft 206 to locate candidate cells to initially establish the ATG communication link, the UE antenna of the aircraft 206 would conventionally need to form beams in a plurality of directions around the azimuth of the aircraft 206, so as to "search" for candidate cells around the azimuth direction. If each beam is very wide, only a few directional beams may need to be formed (e.g., beams in each of four directions, each covering 90 degrees), and thus the time involved in initial cell acquisition by the aircraft 206 might be limited.

However, in some implementations, the UE antenna of the aircraft 206 is configured to use narrower beams, e.g., covering only one, two, three, four, five, ten, twelve, fifteen, or twenty degrees each in the azimuth direction. This narrow or focused beamforming is particularly incentivized in implementations where the ATG communication operates in the unlicensed 2.4 GHz frequency spectrum or another frequency spectrum that experiences a high amount of interference (e.g., interference from Wi-Fi and/or Bluetooth® users in 2.4 GHz, etc.). Such interference substantially degrades the signal to interference and noise ratio (SINR) associated with the beam, and thus, the aircraft uses a high-gain antenna (e.g., phased-array antenna) to form a narrower beam that more precisely aims toward a target and enable the target to successfully receive the transmission. In the context of cell searching, though, the aircraft 206 may need to transmit the beam in a much higher number of different directions around the azimuth to find candidate cells (e.g., 360 directions spaced apart from one another at intervals of one degree around the azimuth, 180 directions spaced apart at intervals of two degrees, 120 directions at three-degree intervals, 72 directions at five-degree intervals, 36 directions at ten-degree intervals, etc.). Moreover, the UE of the aircraft 206 may need to perform a blind search of all possible physical cell identifiers (PCIs) in each direction, thereby multiplying the actions required in candidate cell searching.

Systems and methods described herein improve upon at least these technological challenges by using line-of-sight nature of ATG communications to rely on geometric calculations at the aircraft UE to identify candidate cells for the ATG communication link, select a best candidate cell from among the candidate cells, and attempt to establish the ATG communication link with the selected candidate cell.

At a high level, UE of the aircraft obtains a pre-loaded sitemap indicating locations of gNBs in the communication network over a geographic area, and the identities and special orientations of the cells for each gNB. The sitemap can be pre-loaded to the UE while the aircraft is on the ground, rather than needing to be provided to the UE by the RAN during flight. When the aircraft is in flight and ready to form an ATG communication link to the ground, the UE uses the sitemap to identify candidate cells for the communication link based on the UE's spatial location (latitude, longitude, and altitude) and the cell identity, location, and orientation information contained in the sitemap. The UE prioritizes the candidate cells (or "neighbor cells") by a figure of merit that allows the UE to maximize the probability of successful system synchronization upon attempting to connect to a given candidate cell. By directing the UE beam to the specific location of the selected candidate cell(s), the UE significantly reduces time delays associated in the cell search and synchronization procedures, particularly in implementations where the UE uses narrow beamforming (e.g., in the 2.4 GHz spectrum or other high-interference spectrum(s)). The UE may use this procedure to access and/or modify the sitemap in real time based on its location, to create, access, and/or modify neighbor lists in the sitemap corresponding to the latitude, longitude, and altitude of the aircraft. The UE may reference the sitemap to identify candidate cells both in initial establishment of the ATG communication link (e.g., when the aircraft first reaches a service altitude during flight), and also during handover of the ATG communication link (e.g., to identify a new cell for service when the aircraft moves out of coverage range of a previous serving cell). Although, as previously mentioned, the sitemap can be pre-loaded to the UE while the aircraft is on the ground, it should be appreciated that, in some embodiments, the sitemap may be loaded and/or updated to the UE using the ATG communication link (and/or still another communication link) once the ATG communication link or other communication link has been established.

These processes will be described in further detail with respect to FIG. 4.

Example Process

Figure 4:
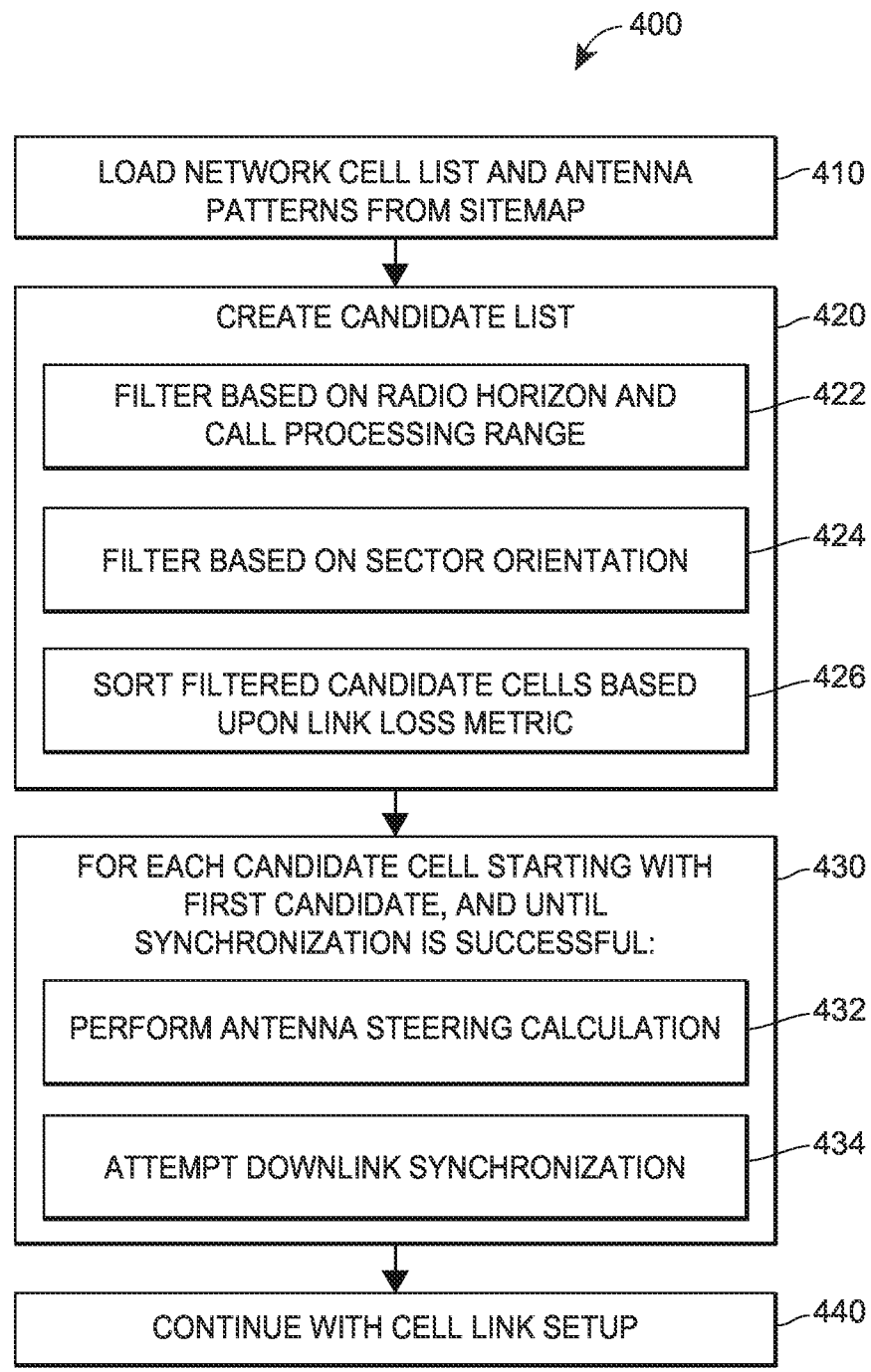
FIG. 4 depicts a block diagram of an example process, in accordance with some embodiments.

In accordance with the above, FIG. 4 depicts a block diagram of an example process 400, in accordance with embodiments of the systems and methods described herein. The process 400 may be implemented, for example, via computing elements described in FIGS. 1-3 and/or computing elements that will be described with respect to FIG. 5. Particularly, though, it should be appreciated that actions of the process 400 may be performed by the UE of the aircraft (e.g., UE 104 of aircraft 106 as depicted in FIG. 1, executing instructions stored at one or more memories and/or one or more computer readable media associated with the UE).

The process 400 includes the UE loading (410), from the sitemap, (1) a list of cells and/or base stations (gNBs) in the communication network (e.g., 5G network), and (2) antenna patterns defining gains for any direction in azimuth and elevation for the UE antenna and for the gNB antennas. The loaded information from the sitemap may contain physical cell identifiers of each cell, such that the aircraft UE will not need to blindly search all PCIs in an attempt to connect to a given cell.

The sitemap may, for example, be provided to the UE at the time of initial provisioning of the UE aboard the aircraft (i.e., before the aircraft is in the air), with the sitemap as provided to the UE including at least the information for the geographic area in which the aircraft operates (e.g., the continental United States). On the ground, the sitemap may be maintained by the network's element management system (EMS), updated whenever new cells are added to the network, and once again provided to the aircraft when the aircraft is on the ground and connected to the ground-based communication network. In the air, the UE has access to its own geographic location (latitude, longitude, and altitude) from instrumentation aboard the aircraft (e.g., an ARINC 429 bus and/or dedicated sensors). The aircraft location information, in combination with the sitemap, provides the UE with the inputs necessary to perform the geometric calculations defining the special relations between the UE and the network.

The process 400 further includes creating a list of candidate cells for the communication link between the UE and the ground (420), the candidate cells being selected from among the cells of the base stations in the network defined by the sitemap. The creation of the list of candidate cells may also be referred to herein as a "filtering stage," as the creation of the list of candidate cells may include filtering the initial list of candidate cells in the sitemap based upon radio horizon and call processing range (422) and based on cell orientation (424).

More particularly, when the aircraft UE reaches a predefined service altitude (e.g., when the aircraft reaches 10,000 feet after takeoff), the UE performs a first filtering step based upon the radio horizon. That is, as depicted in FIGS. 2 and 3, the UE at action 422 filters the list of candidate cells to include only those cells within the radio horizon of the UE, which varies as a function of the UE altitude. In embodiments, filtering based upon the radio horizon includes consideration of signal diffraction caused by the atmosphere, and/or geographic features on the ground (e.g., the UE adjusts the radio horizon based upon atmospheric conditions and/or presence of geographic features known to the UE). Further, still at action 422, the UE filters the candidate cell list based upon a call processing range, which is fixed by the decoding window of the physical layer in which the communication link is to be established. Effectively, all cells outside the radio horizon or the call processing range are removed from consideration in the list of candidate cells.

At action 424, the UE filters the candidate cell list based upon cell orientation. That is, cell having respective angular orientations in the azimuth that do not cover the location of the aircraft UE are removed from consideration in the list of candidate cells. For example, as depicted in FIG. 3, even though the gNB 302a is within the radio horizon, cells other than the cell 322a are removed from consideration because only the cell 322a is directed toward the aircraft 206. In any case, using geometric relations between the UE location and the cell location and orientation, the UE determines whether the UE is within coverage of each given cell. Effectively, the filtering action 424 leaves only the candidate cells within range of the UE and directed toward the UE. It should be noted that, in some embodiments, the filtering action 424 includes a hysteresis component when the aircraft is near a boundary of two adjacent cells (e.g., the UE may remove a cell from consideration if the aircraft is about to move outside of the cell, and/or the UE may include a cell in the candidate cell list when the aircraft is not within the cell but will soon be within the cell e.g., in 30 seconds, one minute, etc.).

Next, the UE obtains a link loss metric for each candidate cell in the filtered candidate cell list, and sorts the candidate cell list based upon the link loss metric (426). Generally the sorting is performed so that the candidate cell to which the UE will first attempt synchronization is the cell with the highest probability of successful connection to the UE. The link loss metric for a given cell may generally attempt to take into account antenna gains of the UE antenna and the gNB antenna of the given cell, as well as the free space path loss between the UE and the gNB of the given cell. The link loss metric for a given cell may, for example, include the slant distance between the UE and the cell, since slant distance is directly correlated to free space loss. The cell at the shortest distance from the UE has the lowest path loss, and is thus expected to have the strongest signal to the UE. The link loss metric for a given cell may additionally or alternatively include the UE antenna gain in the direction of the cell, and/or the cell antenna gain in the direction of the UE. In some embodiments, the UE combines the slant distance, UE antenna gain, and cell antenna gain to obtain the total link loss metric for a given cell. In any case, the UE obtains the respective link loss metrics for each cell, and may sort the candidate cell list in descending order of link loss (with the most favorable cell being ranked first, and the least favorable cell being ranked last), or otherwise operate to select the candidate cell with the most favorable link loss metric.

Once the candidate cell list is filtered (an sorted, in some embodiments), the UE attempts to connect to candidate cells by order of their link loss metric value, with the first candidate cell being the cell with the most favorable link loss metric value (430). For a selected cell (e.g., the first cell), the UE antenna forms a beam in the direction of the cell location (432). The UE determines this direction geometrically using the UE location and cell location. Because the physical cell identifier (PCI) for each cell is included in the sitemap at the UE, the UE does not need to perform a blind search of multiple PCIs for the cell. Instead, the UE attempts downlink synchronization to the specific PCI stored in the sitemap for the selected cell (434). If downlink synchronization with the selected cell is successful, the action 430 may end. Alternatively, if downlink synchronization with the selected cell is not successful, the UE repeats the actions 432 and 434 for the next-highest-ranked cell in the candidate cell list. The action 430 continues until either the UE has successful synchronized with a candidate cell or all candidate cells have been exhausted. Upon successfully synchronizing with a candidate cell (a "connected cell"), the UE proceeds with any additional actions required to complete establishment of the ATG communication link to the connected cell (440).

Connection handovers in the system described herein may be performed via the UE in a manner similar to that described above with respect to the process 400. For example, at any time after the initial connection has been established, the UE may determine a second candidate cell list (or "neighbor list") for the current UE location, and attempt to establish an ATG communication link to a cell from the second candidate cell list. This technique has benefits over typical practices of an RAN providing a neighbor list to the UE from the ground, at least because the candidate list according to the systems and methods herein is constructed by the UE specifically for the location of the UE.

It should be appreciated that the process 400 may contain additional, fewer, and/or alternate actions to those depicted in FIG. 4, including any suitable actions described in this detailed description. Moreover, the order of actions in the process 400 may vary, in some embodiments.

Example Computing Device

Figure 5:
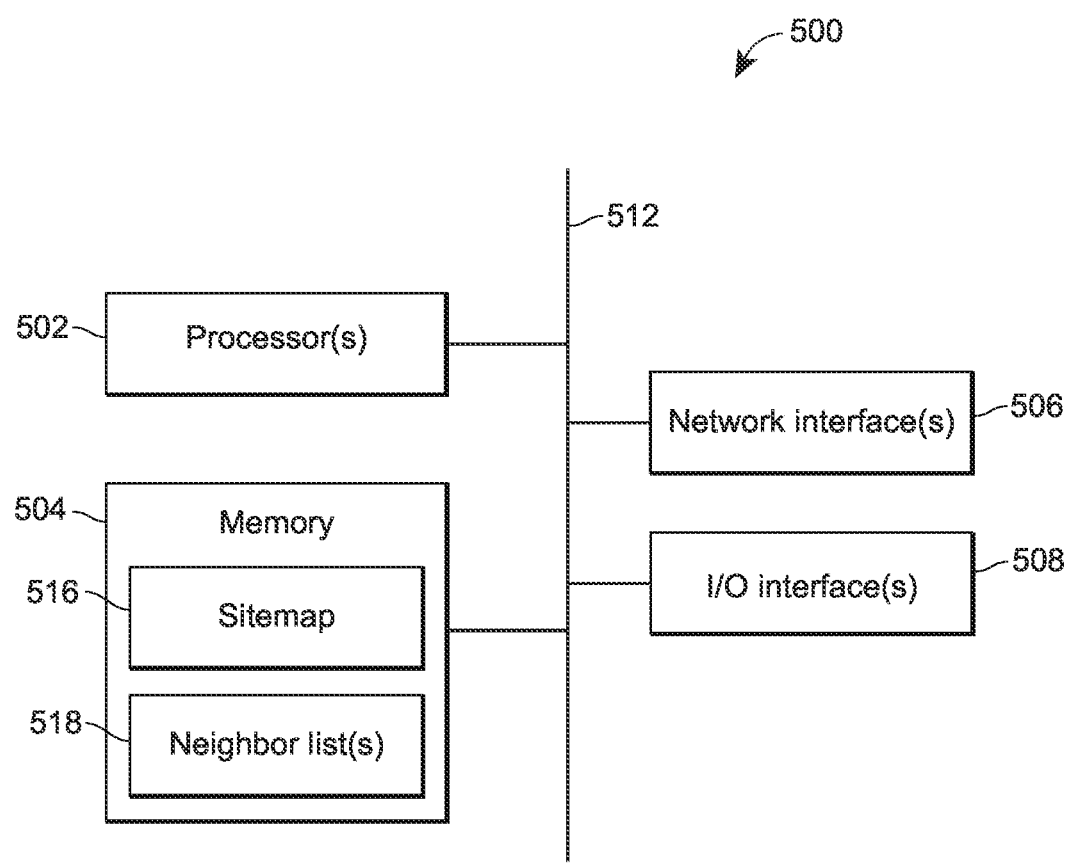
FIG. 5 depicts a block diagram of an example computing device, in accordance with some embodiments.

FIG. 5 depicts an example computing device 500 associated with systems and methods described herein. The computing device 500 may, for example, correspond to the UE of an aircraft (e.g., UE 104 of aircraft 106 of FIG. 1, or a UE of the aircraft 206 of FIGS. 2 and/or 3).

The computing device 500 includes a processor 502 (i.e., one or more processors), such as a microprocessor, controller, and/or other suitable type of processor. The computing device 500 further includes a memory 504 (i.e., one or more computer memories), which may include volatile memory and/or non-volatile memory containing computer executable instructions accessible by the processor 502 to cause the computing device 500 to perform actions described herein. The computing device 500 further includes a network interface 506 (i.e., one or more network communication interfaces) and/or an input/output (I/O) interface 508 (i.e., one or more input and/or output interfaces). The components of the computing device 500 are operatively coupled to each other via a computing bus 512.

The network interface 506 may, for example, enable the computing device 500 to communicate with one or more other devices such as a gNB and/or one or more devices aboard an aircraft (e.g., aircraft instrumentation, passenger devices, etc.). The network interface 506 may include any suitable type of communication interface(s), such as wired interfaces and/or wireless interfaces configured to operate in accordance with any suitable communication protocol(s). Example network interfaces 506 include a TCP/IP interface, a Wi-Fi™ transceiver (e.g., according to the IEEE 802.11x family of standards), an Ethernet transceiver, a cellular network radio, a satellite network radio, or any other suitable interface based upon any other suitable communication protocols or standards. The I/O interface 508 may include, for example, a Bluetooth® interface, a near-filed communication (NFC) interface, a universal serial bus (USB) interface a serial interface, an infrared interface, etc., to enable receipt of user input (e.g., a touch screen, keyboard, mouse, touch pad, joystick, trackball, microphone, button, etc.) and communication of output data to the user (e.g., via a display, speaker, printer, etc.).

Returning to the memory 504, non-transitory portions of the memory 504 may particularly include a sitemap 516 and/or one or more neighbor lists 518 as described in this detailed description. Instructions stored at the memory 504 may cause the computing device 500 to perform various actions with respect to the sitemap 516 and/or neighbor list(s) 518, such as loading the sitemap 516, loading a neighbor list 518 for a given location of the computing device 500, and/or updating a neighbor list 518 for a given location of the computing device 500.

The computing device 500 may include additional, fewer, and/or alternate components in various embodiments, including components described in this detailed description.

Example Computer-Implemented Method

Figure 6:
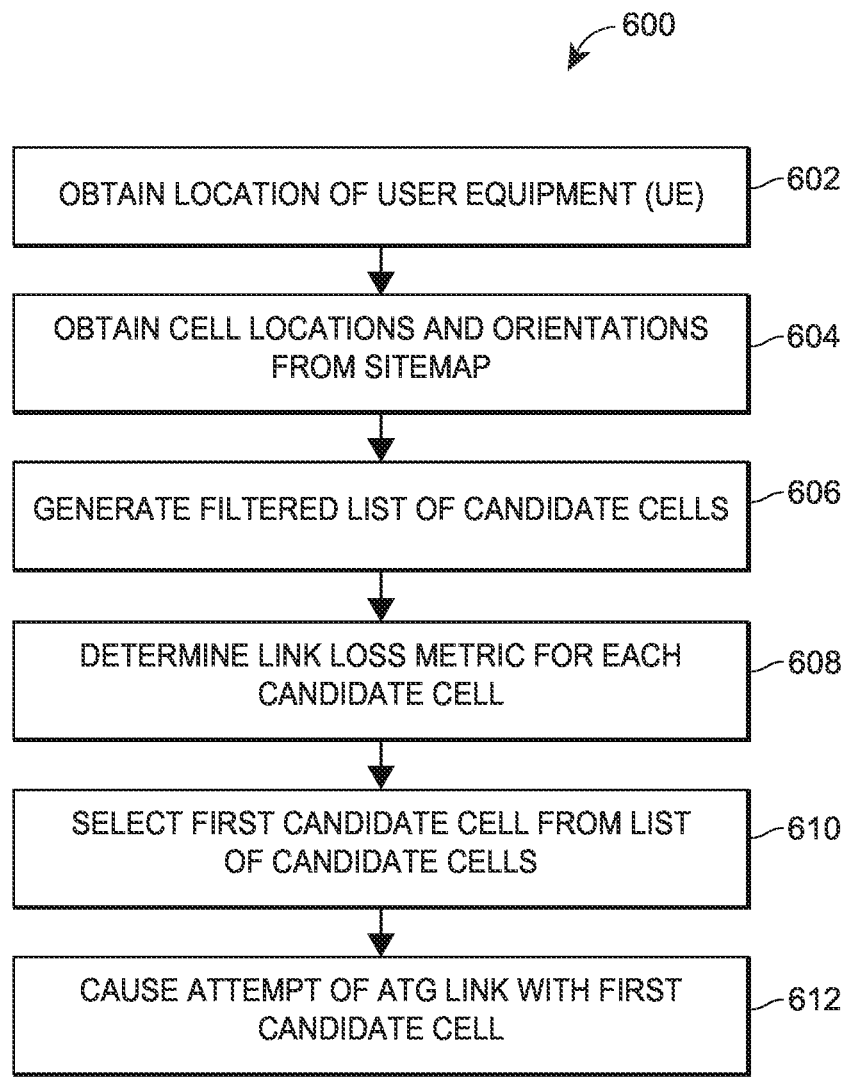
FIG. 6 depicts a block diagram of an example computer-implemented method in accordance with some embodiments.

FIG. 6 depicts an example computer-implemented method 600, in accordance with some embodiments. The method 600 may be implemented, for example, via computing elements described in FIGS. 1-3 and/or FIG. 5 (e.g., via one or more processors executing non-transitory computer executable instructions stored at one or more memories). Particularly, though, it should be appreciated that actions of the method 600 may be performed by the UE of an aircraft in-flight (e.g., UE 104 of aircraft 106 as depicted in FIG. 1).

The method 600 includes obtaining a location of the UE (602, e.g., the latitude, longitude, and altitude of the aircraft as determined by instrumentation of the aircraft).

A memory of the UE (e.g., one or more non-transitory computer readable memories) stores a sitemap. The method 600 includes obtaining, from the sitemap, respective locations, cell orientations and/or cell identifiers (e.g., PCIs) of a plurality of network cells in a ground-based communication network (604, e.g., a 5G network such as a 5G New Radio (NR) network). Each of the network cells is respectively implemented by a corresponding one of a plurality of terrestrial base stations (e.g., 5G towers) each having a corresponding base station antenna (e.g., as depicted in FIGS. 1, 2, and 3).

In some embodiments, the method 600 includes obtaining an antenna gain pattern table. The antenna gain pattern table may define respective gain values for a plurality of directions in azimuth and elevation from the aircraft antenna. Additionally or alternatively, the antenna gain pattern table may respective gain values for a plurality of directions in azimuth and elevation from the corresponding antenna at each of the plurality of terrestrial base stations.

The method 600 further includes generating a filtered list of candidate cells for establishing an air-to-ground (ATG) communication link with an antenna of the aircraft (606, e.g., 5G ATG communication link). The list of candidate cells is selected from among the plurality of network cells based at least upon the UE location and the respective locations and cell orientations of the plurality of network cells (e.g., cells outside of the radio horizon and/or not oriented toward the UE are excluded from the filtered list of candidate cells).

The method 600 still further includes determining a value of a link loss metric for each respective candidate cell in the list of candidate cells (608). The link loss metric value is indicative of a likelihood of the aircraft antenna at the UE location successfully forming an ATG communication link to the respective candidate cell (e.g., a highest score indicates the highest or lowest likelihood of the ATG communication link being successful using the respective candidate cell from the UE location). In some embodiments, the filtered list of candidate cells is then sorted based upon the link loss metric (e.g., to make the first entry in the filtered list of candidate cells be the candidate cell with the highest likelihood of successful connection).

In some embodiments, the link loss metric for a particular candidate cell is determined based at least in part upon a slant distance between the aircraft antenna and the corresponding antenna of the corresponding terrestrial base station for the particular candidate cell. Additionally or alternatively, in embodiments in which the antenna gain pattern table is obtained, the link loss metric value for a particular candidate cell may be determined at least in part upon (1) a gain value for the aircraft antenna in the direction of the particular candidate cell, and/or (2) a gain value in the direction of the aircraft antenna for the corresponding antenna of the terrestrial base station corresponding to the particular candidate cell.

The method 600 still further includes selecting a first candidate cell from among the list of candidate cells (610). Specifically, the first candidate cell is selected based upon determining that the first candidate cell is the cell that has at least one of (1) the highest likelihood from among the list of candidate cells of successfully establishing the ATG communication link with the aircraft antenna (e.g., the first candidate cell has the highest or lowest link loss metric value, or the first candidate cell is at the top of the sorted list of candidate cells), or (2) at least a predetermined threshold likelihood of successfully establishing the ATG communication link. If, for example, no candidate cell meets the predetermined threshold likelihood, the candidate cell with the highest likelihood may be selected. In some embodiments, upon a determination that any particular candidate cell has at least the predetermined threshold likelihood (e.g., 70%, 80%, 90%, 95%, 98%, 99%, etc.), the particular candidate cell may be selected, even if link loss metrics may not have yet been determined for at least one other of the list of candidate cells.

The method 600 further includes causing the aircraft antenna to attempt to establish the ATG communication link with the first candidate cell (612, e.g., attempt downlink synchronization of the aircraft antenna to the candidate cell via the corresponding base station antenna).

In some embodiments, the method 600 further includes obtaining an indication that the attempt to establish the ATG communication link with the first candidate cell failed to successfully establish the ATG communication link. In these embodiments, the method 600 may also include selecting, from the list of candidate cells, a second candidate cell based upon determining that the second candidate cell has a next-highest likelihood from among the list of candidate cells of successfully establishing the ATG communication link with the aircraft antenna, and causing the aircraft antenna to attempt to establish the ATG communication link with the second candidate cell. This process may repeat iteratively, attempting to connect to the cell with the next-highest likelihood of successfully establishing the ATG communication link, until either the ATG communication link is successfully established or all candidate cells in the filtered list have been exhausted unsuccessfully. Alternatively, in the same event that the ATG link with the first candidate cell failed, if the first candidate cell was selected before link loss metrics had been determined for other ones of the list of candidate cells (e.g., the first cell was selected because it was the first cell to meet the predetermined threshold), then the method 600 may include determining respective link loss metric values for subsequent cells from the candidate list. The method 600 may then include attempting to establish the ATG link with the second candidate cell after determining based upon the corresponding link loss metric value that (1) the second candidate cell has at least the predetermined threshold likelihood of successfully establishing the ATG link, and/or (2) the second candidate cell has the highest likelihood of all cells or all cells yet examined in the list of candidate cells.

In some embodiments, the method 600 further includes storing a record of the filtered list of candidate cells at the UE memory, the stored record including information identifying the UE location corresponding to the filtered list of candidate cells. In these embodiments, the method 600 may still further include accessing the stored record upon a determination that a current location of the UE corresponds to the UE location identified in the stored record (e.g., the next time the UE is at the same location or a close location, the UE may use the stored record for the location to identify candidate cells).

In some embodiments, the method 600 further includes downloading the sitemap to the UE memory while the aircraft is on the ground and connected to the ground-based communication network. Additionally or alternatively, in some embodiments, the method 600 may include downloading an updated sitemap to the UE memory while the aircraft is in the air (e.g., after the ATG communication link and/or another communication link between the aircraft and the ground has been established, for example using actions of the method 600 as previously described).

In some embodiments, the method 600 is performed as at least part of a handover process. That is, the attempt to establish the ATG communication link with the first candidate cell corresponds to a handover of the ATG communication link from a previous network cell providing network connectivity to the aircraft. Alternatively, the attempt to establish the ATG communication link may be a first attempt to provide connectivity to the aircraft in-flight, e.g., upon the aircraft reaching a predefined service altitude.

In some embodiments, the generating of the filtered list of candidate cells takes into account the current heading and/or speed of the aircraft (e.g., as obtained by the UE from other aircraft instrumentation). For example, if the UE is near a border between two adjacent network cells, a first cell may be included in the filtered list of candidate cells if the UE is not within the angular coverage of the first cell, but will soon be within the angular coverage area of the first cell based upon the aircraft speed and/or heading (e.g., the aircraft will be in the angular coverage area of the first cell by the time the antenna attempts to establish the ATG communication link). Additionally or alternatively, a second cell may be excluded the filtered list of candidate cells if the UE is within the angular coverage area of the second cell, but will soon be outside of the coverage area of the second cell based upon the aircraft speed and/or heading (e.g., the aircraft will be outside of the angular coverage area of the second cell by the time the antenna attempts to establish the ATG communication link).

It should be appreciated that the method 600 may contain additional, fewer, and/or alternate actions to those depicted in FIG. 6, including any suitable actions described in this detailed description. Moreover, the order of actions in the method 600 may vary, in some embodiments. In some embodiments, the method 600 is implemented by one or more processors executing instructions stored at one or more non-transitory computer readable media or one or more computer memories of a computer system, which may store the sitemap and/or antenna gain pattern table, and/or otherwise cause the one or more processors to obtain the sitemap and/or antenna gain pattern table (e.g., from another one or more memories operatively coupled to the one or more processors).

Additional Considerations

This detailed description has disclosed embodiments in which an ATG communication link operates in the 2.4 GHz unlicensed frequency spectrum. However, it should be appreciated that the systems and methods herein may be applied in communication links using different frequency spectra, such as the 850 MHz FDD licensed frequency band. Licensed channels are comparatively less likely than unlicensed channels to be subject to signal interference that motivates the use of narrow beamforming, but may nonetheless use narrow beamforming to improve link margins (e.g., using phased-array antennas).

Although this detailed description has disclosed embodiments relating to ATG communications between an aircraft and the ground, similar systems and methods may be applied toward satellite links (e.g., where the aircraft accesses the ground-based network by way of one or more satellites, such as low-earth orbit (LEO) satellites. The aircraft UE may determine satellite link availability geometrically in a similar manner to determination of cell availability as described herein (e.g., a satellite is available to the UE when the earth does not block a direct-line path between the UE and the satellite). The UE may determine a link margin or link loss metric for a particular satellite via free space signal propagation models (e.g., to determine free space path loss between the UE and the satellite), and/or by determining UE antenna gain in the direction of the satellite and/or satellite antenna gain in the direction of the UE. Aircraft-to-LEO links typically use phased-array antennas with narrow beams, and have multiple satellite choices for connection handovers, making the systems and methods described herein potentially applicable to satellite-enabled networks (e.g., 5G satellite networks or other satellite networks).

Although this detailed description has disclosed embodiments relating to aircraft, similar systems and methods may be applied in other types of vehicles, including trains, ships, buses, cars, etc. For example, a similar user equipment unit (UE) and antenna may be provisioned to the train, ship, bus, car, etc., and the UE may obtain and store a sitemap identifying communication network cell locations and orientations such that the UE may identify candidate cells for the current location of the train, ship, bus, car, etc.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

When implemented, any of the methods and techniques described herein or portions thereof may be performed by executing software stored in one or more non-transitory, tangible, computer readable storage media or memories such as magnetic disks, laser disks, optical discs, semiconductor memories, biological memories, other memory devices, or other storage media, in a RAM or ROM of a computer or processor, etc.

This detailed description is to be construed as examples and does not describe every possible embodiment, as describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects:

1. A computer-implemented method performed via one or more processors of a user equipment unit (UE) aboard an aircraft in-flight, the method comprising: obtaining a location of the UE; obtaining, from a sitemap stored at a memory of the UE, respective locations, cell orientations and cell identifiers of a plurality of network cells in a ground-based communication network, each of the network cells respectively being implemented by a corresponding one of a plurality of terrestrial base stations each having a corresponding base station antenna; generating a filtered list of candidate cells for establishing an air-to-ground (ATG) communication link with an antenna of the aircraft, the list of candidate cells being selected from among the plurality of network cells based at least upon the UE location and the respective locations and cell orientations of the plurality of network cells; determining a value of a link loss metric for each respective candidate cell in the list of candidate cells, a link loss metric value indicative of a likelihood of the aircraft antenna at the UE location successfully forming an ATG communication link to the respective candidate cell; selecting a first candidate cell from among the list of candidate cells, based upon determining that the first candidate cell has one at least one of (1) a highest likelihood from among the list of candidate cells of successfully establishing the ATG communication link with the aircraft antenna, or (2) at least a predetermined threshold likelihood of successfully establishing the ATG communication link; and/or causing the aircraft antenna to attempt to establish the ATG communication link with the first candidate cell.

2. The computer-implemented method of aspect 1, further comprising: obtaining an indication that the attempt to establish the ATG communication link with the first candidate cell failed to successfully establish the ATG communication link; selecting, from the list of candidate cells, a second candidate cell based upon determining that the second candidate cell has at least one of (1) a next-highest likelihood from among the list of candidate cells of successfully establishing the ATG communication link with the aircraft antenna, or (2) at least the predetermined threshold likelihood of successfully establishing the ATG communication link; and/or causing the aircraft antenna to attempt to establish the ATG communication link with the second candidate cell.
3. The computer-implemented method of aspects 1 or 2, further comprising: storing a record of the filtered list of candidate cells at the UE memory, the stored record including information identifying the UE location corresponding to the filtered list of candidate cells; and/or accessing the stored record upon a determination that a current location of the UE corresponds to the UE location identified in the stored record.
4. The computer-implemented method of any one of aspects 1 to 3, further comprising downloading the sitemap to the UE memory while the aircraft is on the ground and connected to the ground-based communication network.
5. The computer-implemented method of any one of aspects 1 to 4, further comprising sorting the filtered list of candidate cells based upon the link loss metric.
6. The computer-implemented method of any one of aspects 1 to 5, further comprising obtaining an antenna gain pattern table defining at least one of (1) respective gain values for a plurality of directions in azimuth and elevation from the aircraft antenna, or (2) respective gain values for a plurality of directions in azimuth and elevation from the corresponding antenna at each of the plurality of terrestrial base stations
7. The computer-implemented method of aspect 6, wherein the link loss metric for a particular candidate cell is determined based at least upon information in the antenna gain pattern table defining at least one of (1) a gain value for the aircraft antenna in the direction of the particular candidate cell, or (2) a gain value in the direction of the aircraft antenna for the corresponding antenna of the terrestrial base station corresponding to the particular candidate cell.
8. The computer-implemented method of any one of aspects 1 to 7, wherein the link loss metric for a particular candidate cell is determined based at least upon a slant distance between the aircraft antenna and the corresponding antenna of the corresponding terrestrial base station for the particular candidate cell.
9. The computer-implemented method of any one of aspects 1 to 8, wherein the attempt to establish the ATG communication link with the first candidate cell corresponds to a handover of the ATG communication link from a previous network cell providing network connectivity to the aircraft.
10. The computer-implemented method of any one of aspects 1 to 9, in combination with any other suitable one of aspects 1 to 9.
11. A computer system aboard an aircraft in-flight, the system comprising: one or more processors; and one or more memories storing (1) a sitemap storing respective locations, cell orientations and cell identifiers of a plurality of network cells in a ground-based communication network, each of the network cells respectively being implemented by a corresponding one of a plurality of terrestrial base stations each having a corresponding base station antenna, and (2) non-transitory computer executable instructions that, when executed via the one or more processors, cause the system to: obtain a location of a user equipment unit (UE) of the aircraft; generate a list of candidate cells for establishing an air-to-ground (ATG) communication link with an antenna of the aircraft, the list of candidate cells being selected from among the plurality of network cells based at least upon the UE location and the respective locations and cell orientations of the plurality of network cells; determine a value of a link loss metric for each respective candidate cell in the list of candidate cells, a link loss metric value indicative of a likelihood of the aircraft antenna at the UE location successfully forming an ATG communication link to the respective candidate cell; select a first candidate cell from among the list of candidate cells, based upon determining that the first candidate cell has at least one of (1) a highest likelihood from among the list of candidate cells of successfully establishing the ATG communication link with the aircraft antenna, or (2) at least the predetermined threshold likelihood of successfully establishing the ATG communication link; and/or cause the aircraft antenna to attempt to establish the ATG communication link with the first candidate cell.
12. The computer system of aspect 11, wherein the non-transitory computer executable instructions, when executed via the one or more processors, further cause the system to: obtain an indication that the attempt to establish the ATG communication link with the first candidate cell failed to successfully establish the ATG communication link; select, from the list of candidate cells, a second candidate cell based upon determining that the second candidate cell has at least one of (1) a next-highest likelihood from among the list of candidate cells of successfully establishing the ATG communication link with the aircraft antenna, or (2) a highest likelihood from among the list of candidate cells of successfully establishing the ATG communication link; and/or cause the aircraft antenna to attempt to establish the ATG communication link with the second candidate cell.
13. The computer system of either aspect 11 or 12, wherein the non-transitory computer executable instructions, when executed via the one or more processors, further cause the system to: store a record of the filtered list of candidate cells at the one or more memories, the stored record including information identifying the UE location corresponding to the filtered list of candidate cells; and/or access the stored record upon a determination that a current location of the UE corresponds to the UE location identified in the stored record.
14. The computer system of any one of aspects 11 to 13, wherein the non-transitory computer executable instructions, when executed via the one or more processors, further cause the system to download the sitemap to the one or more memories while the aircraft is on the ground and connected to the ground-based communication network.
15. The computer system of any one of aspects 11 to 14, wherein the non-transitory computer executable instructions, when executed via the one or more processors, further cause the system to sort the filtered list of candidate cells based upon the link loss metric.
16. The computer system of any one of aspects 11 to 15, wherein the one or more memories further store an antenna gain pattern table defining at least one of (1) respective gain values for a plurality of directions in azimuth and elevation from the aircraft antenna, or (2) respective gain values for a plurality of directions in azimuth and elevation from the corresponding antenna at each of the plurality of terrestrial base stations.
17. The computer system of aspect 16, wherein the link loss metric for a particular candidate cell is determined based at least upon information in the antenna gain pattern table defining at least one of (1) a gain value for the aircraft antenna in the direction of the particular candidate cell, or (2) a gain value in the direction of the aircraft antenna for the corresponding antenna of the terrestrial base station corresponding to the particular candidate cell.
18. The computer system of any one of aspects 11 to 17, wherein the link loss metric for a particular candidate cell is determined based at least upon a slant distance between the aircraft antenna and the corresponding antenna of the corresponding terrestrial base station for the particular candidate cell.
19. The computer system of any one of aspects 11 to 18, wherein the attempt to establish the ATG communication link with the first candidate cell corresponds to a handover of the ATG communication link from a previous network cell providing network connectivity to the aircraft.
20. The computer system of any one of aspects 11 to 19, in combination with any other suitable one of aspects 11 to 19.
21. The computer system of any one of aspects 11 to 20, configured to perform the computer-implemented method of any one of aspects 1-10.
22. One or more non-transitory computer readable media storing non-transitory computer executable instructions that, when executed via the one or more processors, cause the one or more processors to: obtain a location of a user equipment unit (UE) aboard an aircraft in-flight; obtain, from a sitemap stored at a memory of the UE, respective locations, cell orientations and cell identifiers of a plurality of network cells in a ground-based communication network, each of the network cells respectively being implemented by a corresponding one of a plurality of terrestrial base stations each having a corresponding base station antenna; generate a filtered list of candidate cells for establishing an air-to-ground (ATG) communication link with an antenna of the aircraft, the list of candidate cells being selected from among the plurality of network cells based at least upon the UE location and the respective locations and cell orientations of the plurality of network cells; determine, via the one or more processors, a value of a link loss metric for each respective candidate cell in the list of candidate cells, a link loss metric value indicative of a likelihood of the aircraft antenna at the UE location successfully forming an ATG communication link to the respective candidate cell; select a first candidate cell from among the list of candidate cells, based upon determining that the first candidate cell has at least one of (1) a highest likelihood from among the list of candidate cells of successfully establishing the ATG communication link with the aircraft antenna, or (2) at least a predetermined threshold likelihood of successfully establishing the ATG communication link; and/or cause the aircraft antenna to attempt to establish the ATG communication link with the first candidate cell.
23. The one or more non-transitory computer readable media of aspect 22, wherein the sitemap is stored at the one or more non-transitory computer readable media.
24. The one or more non-transitory computer readable media of aspect 22, wherein the instructions cause the one or more processors to obtain the sitemap from another one or more memories operatively coupled to the one or more processors.
25. The one or more non-transitory computer readable media of any one of aspects 22-24, in combination with the computer system of any suitable one of aspects 11 to 21.
26. The one or more non-transitory computer readable media of any one of aspects 22-24, configured to cause the one or more processors to perform the computer-implemented method of any one of aspects 1 to 10.
27. Any one of aspects 1 to 26, in combination with any other suitable one or more of aspects 1 to 26.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed:
1. A computer-implemented method performed via one or more processors of a user equipment unit (UE) aboard an aircraft in-flight, the method comprising:
obtaining a location of the UE;
obtaining, from a sitemap stored at a memory of the UE, respective locations, cell orientations and cell identifiers of a plurality of network cells in a ground-based communication network, each of the network cells respectively being implemented by a corresponding one of a plurality of terrestrial base stations each having a corresponding base station antenna;
generating a filtered list of candidate cells for establishing an air-to-ground (ATG) communication link with an antenna of the aircraft, the list of candidate cells being selected from among the plurality of network cells based at least upon the UE location and the respective locations and cell orientations of the plurality of network cells;
determining a value of a link loss metric for each respective candidate cell in the list of candidate cells, a link loss metric value indicative of a likelihood of the aircraft antenna at the UE location successfully forming an ATG communication link to the respective candidate cell, the link loss metric being based on at least one of (1) an antenna gain metric of the respective candidate cell in a direction of the aircraft antenna, the antenna gain metric being indicated by an antenna gain pattern table based upon the direction of the aircraft antenna, or (2) a gain metric of the aircraft antenna in a direction of the respective candidate cell, the gain metric of the aircraft antenna being indicated by the antenna gain pattern table based upon the direction of the respective candidate cell;
selecting a first candidate cell from among the list of candidate cells, based upon determining that the first candidate cell has at least one of (1) a highest likelihood from among the list of candidate cells of successfully establishing the ATG communication link with the aircraft antenna, or (2) at least a predetermined threshold likelihood of successfully establishing the ATG communication link; and
causing the aircraft antenna to attempt to establish the ATG communication link with the first candidate cell.
2. The computer-implemented method of claim 1, further comprising:
obtaining an indication that the attempt to establish the ATG communication link with the first candidate cell failed to successfully establish the ATG communication link;

selecting, from the list of candidate cells, a second candidate cell based upon determining that the second candidate cell has at least one of (1) a next-highest likelihood from among the list of candidate cells of successfully establishing the ATG communication link with the aircraft antenna, or (2) at least the predetermined threshold likelihood of successfully establishing the ATG communication link; and causing the aircraft antenna to attempt to establish the ATG communication link with the second candidate cell.

3. The computer-implemented method of claim 1, further comprising:

storing a record of the filtered list of candidate cells at the UE memory, the stored record including information identifying the UE location corresponding to the filtered list of candidate cells; and accessing the stored record upon a determination that a current location of the UE corresponds to the UE location identified in the stored record.

4. The computer-implemented method of claim 1, further comprising downloading the sitemap to the UE memory while the aircraft is on the ground and connected to the ground-based communication network.

5. The computer-implemented method of claim 1, further comprising sorting the filtered list of candidate cells based upon the link loss metric.

6. The computer-implemented method of claim 1, wherein the link loss metric for a particular candidate cell is determined based at least upon a slant distance between the aircraft antenna and the corresponding antenna of the corresponding terrestrial base station for the particular candidate cell.

7. The computer-implemented method of claim 1, wherein the attempt to establish the ATG communication link with the first candidate cell corresponds to a handover of the ATG communication link from a previous network cell providing network connectivity to the aircraft.

8. A computer system aboard an aircraft in-flight, the system comprising:

one or more processors; and one or more memories storing (1) a sitemap storing respective locations, cell orientations and cell identifiers of a plurality of network cells in a ground-based communication network, each of the network cells respectively being implemented by a corresponding one of a plurality of terrestrial base stations each having a corresponding base station antenna, and (2) non-transitory computer executable instructions that, when executed via the one or more processors, cause the system to:

obtain a location of a user equipment unit (UE) of the aircraft;

generate a filtered list of candidate cells for establishing an air-to-ground (ATG) communication link with an antenna of the aircraft, the list of candidate cells being selected from among the plurality of network cells based at least upon the UE location and the respective locations and cell orientations of the plurality of network cells;

determine a value of a link loss metric for each respective candidate cell in the list of candidate cells, a link loss metric value indicative of a likelihood of the aircraft antenna at the UE location successfully forming an ATG communication link to the respective candidate cell, the link loss metric value being based at least upon one of (1) an antenna gain metric of the respective candidate cell in a direction of the aircraft antenna, the antenna gain metric being indicated by an antenna gain pattern table based upon the direction of the aircraft antenna, or (2) a gain metric of the aircraft antenna in a direction of the respective candidate cell, the gain metric of the aircraft antenna being indicated by the antenna gain pattern table based upon the direction of the respective candidate cell;

select a first candidate cell from among the list of candidate cells, based upon determining that the first candidate cell has at least one of (1) a highest likelihood from among the list of candidate cells of successfully establishing the ATG communication link with the aircraft antenna, or (2) at least a predetermined threshold likelihood of successfully establishing the ATG communication link; and cause the aircraft antenna to attempt to establish the ATG communication link with the first candidate cell.

9. The computer system of claim 8, wherein the non-transitory computer executable instructions, when executed via the one or more processors, further cause the system to:

obtain an indication that the attempt to establish the ATG communication link with the first candidate cell failed to successfully establish the ATG communication link;

select, from the list of candidate cells, a second candidate cell based upon determining that the second candidate cell has at least one of (1) a next-highest likelihood from among the list of candidate cells of successfully establishing the ATG communication link with the aircraft antenna, or (2) at least the predetermined threshold likelihood of successfully establishing the ATG communication link; and cause the aircraft antenna to attempt to establish the ATG communication link with the second candidate cell.

10. The computer system of claim 8, wherein the non-transitory computer executable instructions, when executed via the one or more processors, further cause the system to:

store a record of the filtered list of candidate cells at the one or more memories, the stored record including information identifying the UE location corresponding to the filtered list of candidate cells; and access the stored record upon a determination that a current location of the UE corresponds to the UE location identified in the stored record.

11. The computer system of claim 8, wherein the non-transitory computer executable instructions, when executed via the one or more processors, further cause the system to download the sitemap to the one or more memories while the aircraft is on the ground and connected to the ground-based communication network.

12. The computer system of claim 8, wherein the non-transitory computer executable instructions, when executed via the one or more processors, further cause the system to sort the filtered list of candidate cells based upon the link loss metric.

13. The computer system of claim 8, wherein the link loss metric for a particular candidate cell is determined based at least upon a slant distance between the aircraft antenna and the corresponding antenna of the corresponding terrestrial base station for the particular candidate cell.

14. The computer system of claim 8, wherein the attempt to establish the ATG communication link with the first candidate cell corresponds to a handover of the ATG communication link from a previous network cell providing network connectivity to the aircraft.

15. One or more non-transitory computer readable media storing non-transitory computer executable instructions that, when executed via the one or more processors, cause the one or more processors to:
- obtain a location of a user equipment unit (UE) aboard an aircraft in-flight;
- obtain, from a sitemap stored at a memory of the UE, respective locations, cell orientations and cell identifiers of a plurality of network cells in a ground-based communication network, each of the network cells respectively being implemented by a corresponding one of a plurality of terrestrial base stations each having a corresponding base station antenna;
- generate a filtered list of candidate cells for establishing an air-to-ground (ATG) communication link with an antenna of the aircraft, the list of candidate cells being selected from among the plurality of network cells based at least upon the UE location and the respective locations and cell orientations of the plurality of network cells;
- determine, via the one or more processors, a value of a link loss metric for each respective candidate cell in the list of candidate cells, a link loss metric value indicative of a likelihood of the aircraft antenna at the UE location successfully forming an ATG communication link to the respective candidate cell, the link loss metric value being based at least upon one of (1) an antenna gain metric of the respective candidate cell in a direction of the aircraft antenna, the antenna gain metric being indicated by an antenna gain pattern table based upon the direction of the aircraft antenna, or (2) a gain metric of the aircraft antenna in a direction of the respective candidate cell, the gain metric being indicated by the antenna gain pattern table based upon the direction of the respective candidate cell;
- select a first candidate cell from among the list of candidate cells, based upon determining that the first candidate cell has at least one of (1) a highest likelihood from among the list of candidate cells of successfully establishing the ATG communication link with the aircraft antenna, or (2) at least a predetermined threshold likelihood of successfully establishing the ATG communication link; and
- cause the aircraft antenna to attempt to establish the ATG communication link with the first candidate cell.

16. The one or more non-transitory computer readable media of claim 15, wherein the sitemap is stored at the one or more non-transitory computer readable media.

* * * * *